United States Patent
Edwards, IV et al.

(10) Patent No.: US 12,066,139 B1
(45) Date of Patent: Aug. 20, 2024

(54) PIPE REPAIR PROCESS

(71) Applicant: Allan Edwards, Incorporated, Tulsa, OK (US)

(72) Inventors: Allan John Edwards, IV, Tulsa, OK (US); Herman Precht, Lake Charles, LA (US)

(73) Assignee: Allan Edwards, Incorporated, Tulsa, OK (US)

( * ) Notice: Subject to any disclaimer, the term of this patent is extended or adjusted under 35 U.S.C. 154(b) by 0 days.

(21) Appl. No.: 17/238,651

(22) Filed: Apr. 23, 2021

Related U.S. Application Data

(60) Provisional application No. 63/014,818, filed on Apr. 24, 2020.

(51) Int. Cl.
*F16L 55/178* (2006.01)
*F16L 55/168* (2006.01)

(52) U.S. Cl.
CPC ......... *F16L 55/178* (2013.01); *F16L 55/1683* (2013.01)

(58) Field of Classification Search
CPC ............................ F16L 55/178; F16L 55/1683
USPC ............................ 219/643, 672, 673; 228/216
See application file for complete search history.

(56) References Cited

U.S. PATENT DOCUMENTS

| | | | | |
|---|---|---|---|---|
| 3,499,210 A | * | 3/1970 | Sanders | E21B 17/12 228/232 |
| 4,515,562 A | * | 5/1985 | Williams | C21D 9/08 432/225 |
| 4,558,210 A | * | 12/1985 | Leary | B29C 48/83 219/535 |
| 4,687,894 A | * | 8/1987 | Koga | F16L 13/06 219/674 |
| 5,012,842 A | * | 5/1991 | Savard | F16L 55/17 24/68 CT |
| 5,123,451 A | * | 6/1992 | Savard | F16L 55/17 264/36.16 |
| 5,199,464 A | * | 4/1993 | Savard | F16L 55/17 264/36.16 |

(Continued)

OTHER PUBLICATIONS

Bruce, William A. and John Kiefner. Pipeline Repair Using Full-Encirclement Repair Sleeves. Oil and Gas Pipelines: Integrity and Safety Handbook, 2015, pp. 635-655, [retrieved on Sep. 14, 2022]. Retrieved from Knovel via <URL:https://app.knovel.com/hotlink/pdf/id:kt011UJ7H1/oil-gas-pipelines-integrity> (Year: 2015).*

*Primary Examiner* — David R Deal
(74) *Attorney, Agent, or Firm* — James F. Lea, III; Gable Gotwals

(57) ABSTRACT

A process to repair a pipe including the steps of preparing a pair of sleeve halves which together extend around a circumference of the pipe. Each of the pair of sleeve halves has a pair of opposed beveled edges and each of the pair of sleeve halves has a pair of opposed recessed grooves on an inner side of the sleeve halves. One of the pair of sleeve halves is installed around the pipe. A backing strip is inserted at each of the opposed recessed grooves of the one sleeve halve. Another of the sleeve halves is installed around the pipe so that the recessed grooves receive and retain the backing strips. The pair of sleeve halves are heated with at least one induction heating coil and then the pair of sleeve halves and the backing strips are welded together.

15 Claims, 8 Drawing Sheets

(56) References Cited

U.S. PATENT DOCUMENTS

| | | | |
|---|---|---|---|
| 5,352,871 A * | 10/1994 | Ross | B29C 66/5229 219/676 |
| 5,722,463 A | 3/1998 | Smyth et al. | |
| 5,823,581 A * | 10/1998 | Coppolo | F16L 25/12 285/915 |
| 6,229,126 B1 * | 5/2001 | Ulrich | H05B 6/40 219/662 |
| 6,325,277 B1 * | 12/2001 | Collie | B23K 9/0286 228/44.3 |
| 7,066,210 B2 * | 6/2006 | Kakoschke | F16L 55/172 138/167 |
| 8,038,931 B1 * | 10/2011 | Thomas | H05B 6/101 266/97 |
| 8,397,975 B1 * | 3/2013 | Franco | B23K 37/0533 269/37 |
| 9,982,829 B2 | 5/2018 | Smyth et al. | |
| 10,247,345 B2 * | 4/2019 | McCann | H05B 6/101 |
| 10,336,013 B2 * | 7/2019 | Kestner | B29C 73/34 |
| 11,160,144 B2 * | 10/2021 | Salsich | H05B 6/14 |
| 11,460,138 B1 * | 10/2022 | Smyth | F16L 53/30 |
| 2008/0105671 A1 * | 5/2008 | Regan | B23K 13/015 219/535 |
| 2013/0341320 A1 * | 12/2013 | Tailor | F16L 13/0272 219/674 |
| 2014/0151368 A1 * | 6/2014 | Morrison | H05B 6/36 219/676 |
| 2014/0299595 A1 * | 10/2014 | Sherrill | F16L 53/34 219/676 |
| 2018/0281117 A1 * | 10/2018 | Wood | B23K 33/006 |

\* cited by examiner

PIPE REPAIR PROCESS

CROSS-REFERENCE TO RELATED APPLICATION

This application is based on and claims priority to U.S. Patent Application Serial No. 63/014,818, filed Apr. 24, 2020, which is incorporated herein its entirety by reference.

BACKGROUND OF THE INVENTION

1. Field of the Invention

The present invention is directed to a process to repair a pipe or pipeline externally without cutting or replacing sections of the pipeline. In particular, the present invention is directed to a process to repair a pipeline using sleeve segments heated to expand and then shrink to form a fluid-tight repair.

2. Related Art

Pipelines may become damaged due to rupture, dents, cracking, corrosion, and other factors. Pipeline damages may lead to leakage, environmental and physical damages, and loss of pipeline production.

Pipeline repair may be difficult due to remote locations, severe environmental conditions, and difficulty in accessing the pipeline, such as an underground pipeline.

There are a variety of known ways to address pipeline repairs. It is possible to cut away a longitudinal section of damaged pipeline and replace the damaged longitudinal section. Other repair methods include slip lining wherein an interior sleeve is inserted into the pipeline. Another known method of repair includes placing an external sleeve or sleeve sections around the damaged pipeline section and then welding the external sleeve sections together. U.S. Pat. Nos. 5,722,463 and 9,982,829 show further alternatives wherein sleeve sections are heated to expand the sleeve sections and then welded. Upon cooling, the sleeve sections shrink and enhance the radial clamping force with the pipeline.

Notwithstanding the foregoing, there remains a need to provide a pipeline repair method using sleeve segments surrounding a pipeline that may be heated under controlled conditions and then welded without damage to the pipeline.

SUMMARY OF THE INVENTION

The present invention is directed to a system and a sequential process to repair a pipe or a pipeline. Initially, a pair of sleeve segments are prepared to surround the circumference of the pipe. Each of the sleeve segments has a pair of opposed longitudinal beveled or mitered edges. When installed, each of the beveled or mitered edges of the sleeve segments is parallel to an axis of the sleeve segments and also parallel to an axis of the pipe.

Each of the sleeve segments also includes a pair of recessed longitudinal slots, notches, or grooves on an inner side of the sleeve segments along the longitudinal edges. The recessed grooves from one sleeve segment align with the grooves of another opposed sleeve segment to form an opening in order to receive and retain backing strips.

An initially liquid filler is applied to the outside of the pipe, to the inside of the sleeve segments, or to both. The initially liquid filler fills any exterior pipe deformations and will cure to a solid after the sleeve segments are installed.

Thereafter, backing strips are put in place in the spaces formed by recessed grooves.

The sleeve segments and the backings strips are then firmly held in place, such as with a chain clamp. In one non-limiting embodiment, a pair of hydraulic or mechanical sleeve clamps are utilized.

A weld gap is formed between the longitudinal edges of the opposed segments formed by the longitudinal opposed beveled or mitered edges and the backing strips.

An induction heating coil is installed on each of the sleeve segments and held in place.

Thereafter, the induction heating coils are started in order to cause the sleeve segments to expand while the backing strips and the pipe remain in their original condition. Once a desired temperature has been achieved, the base of the weld gaps is measured. Once the base of the weld gaps is within a specified measurement range, the sleeve segments and the underlying backing strips will be welded together.

As an alternative, the sleeve segments and the backing strips are tack welded. After completion of the tack welds, the induction heat coils will be turned off and removed. As the sleeve segments cool, they will tighten around the pipe and enhance the fit and seal around the pipe.

After removal of the induction heat coils and the hydraulic sleeve clamps, the entire horizontal weld gap seams will be welded.

DETAILED DESCRIPTION OF THE INVENTION

Figure 1:
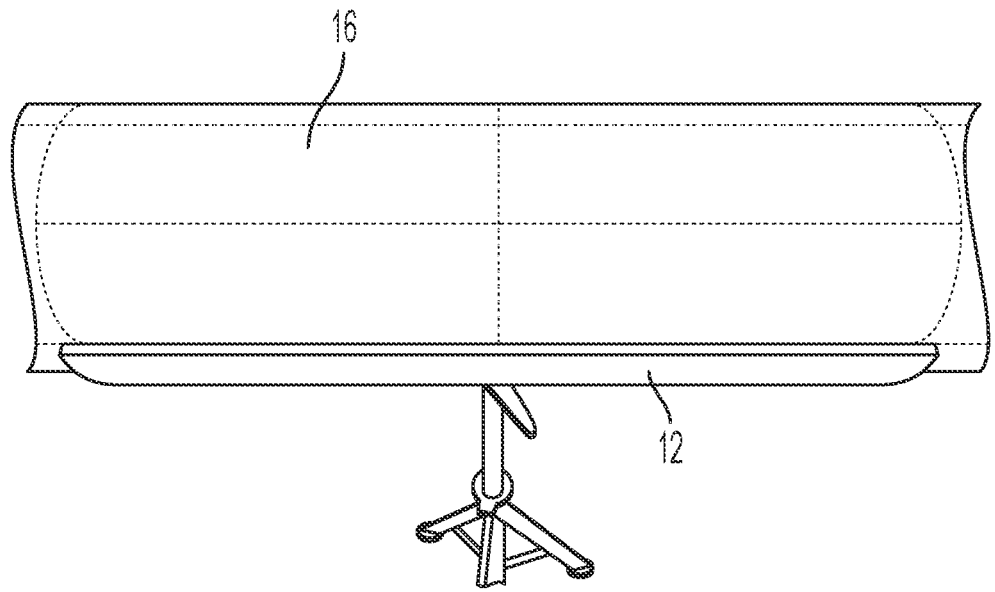
FIGS. 1, 2, 3 and 4 illustrate the first sequential steps of the pipe repair process in accordance with the present invention.

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

The present invention is directed to a sequential process to repair a pipe or a pipeline. Referring to the drawings in detail, FIGS. 1, 2, 3 and 4 illustrate the first sequential steps of the process. Initially, at least a pair of sleeve segments 12 and 14 are prepared, which sleeve segments together extend around and surround a circumference of a pipe 16 to be repaired.

In the present embodiment, each of the sleeve segments 12 and 14 is semi-circular in cross-section. In the present embodiment, two sleeve segments 12 and 14 are utilized to surround the circumference of the pipe 16, however, it will be understood that more than two sleeve segments may be utilized to together surround the circumference of the pipe 16 to be repaired.

Figure 2:
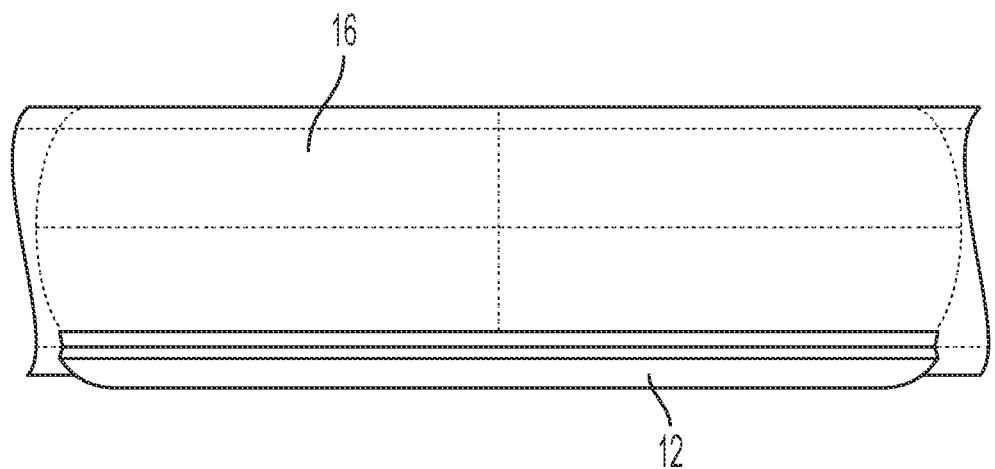

In FIGS. 1 and 2, only one sleeve of two sleeve segments has been moved in place around the pipe.

The present invention may be utilized with pipes of various diameter. The process may be used while the pipe or pipeline is empty or filled.

Figure 4:
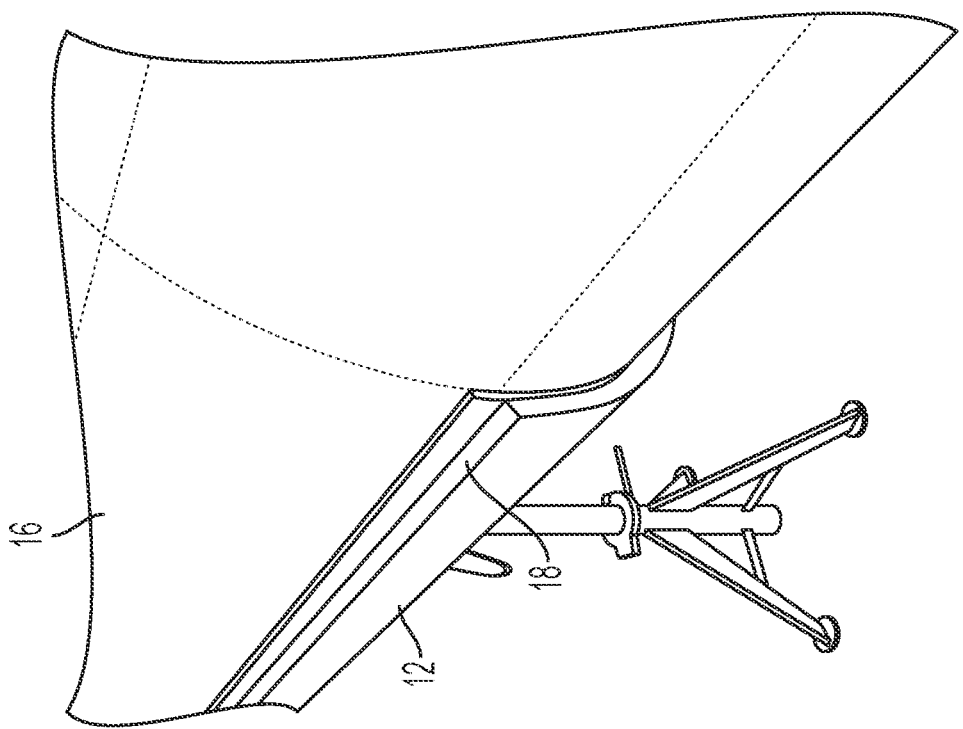
Figure 3:
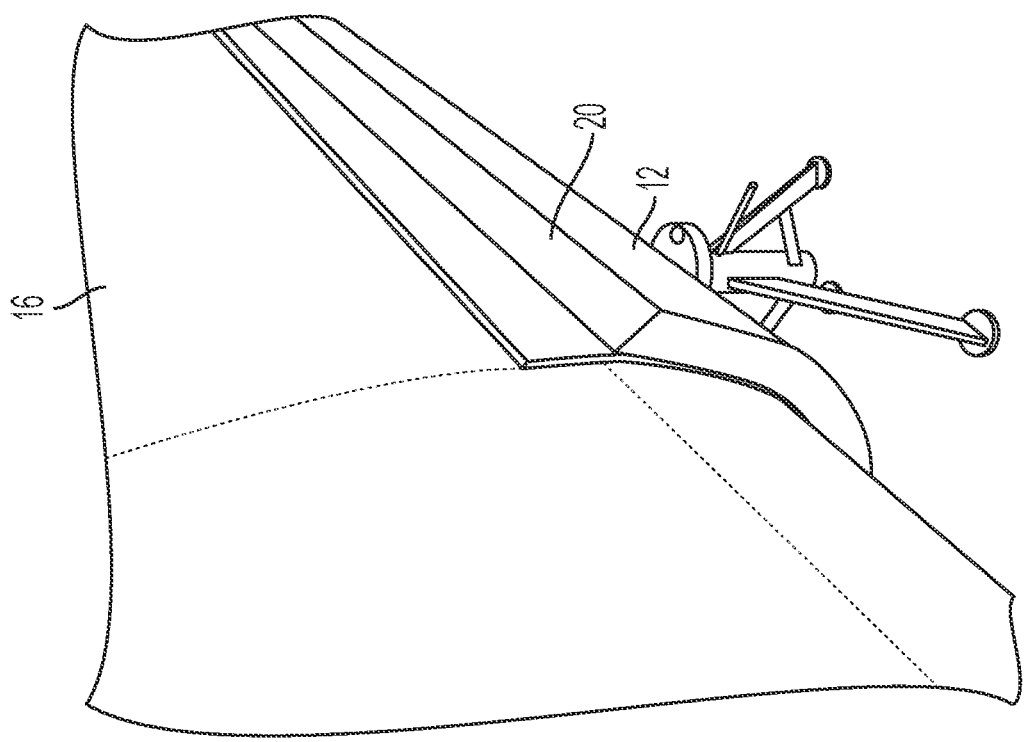
Figure 6:
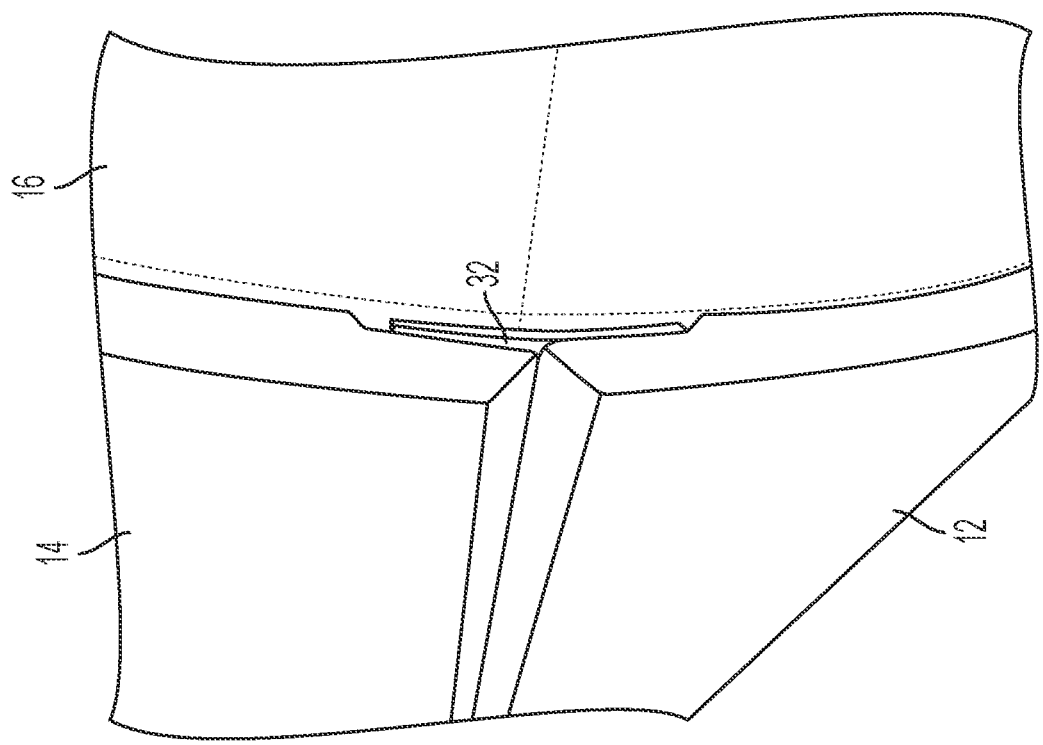
FIGS. 5, 6, 7 and 8 illustrate backing strips and sleeve segments in place around the pipe.
Figure 5:
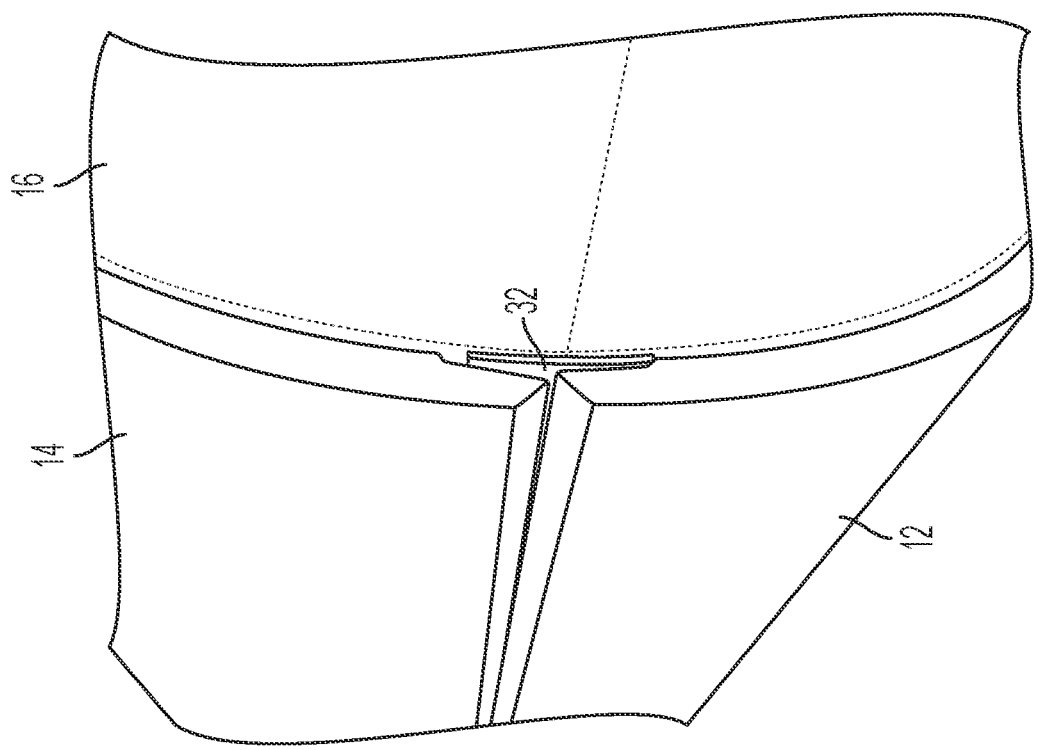
Figure 8:
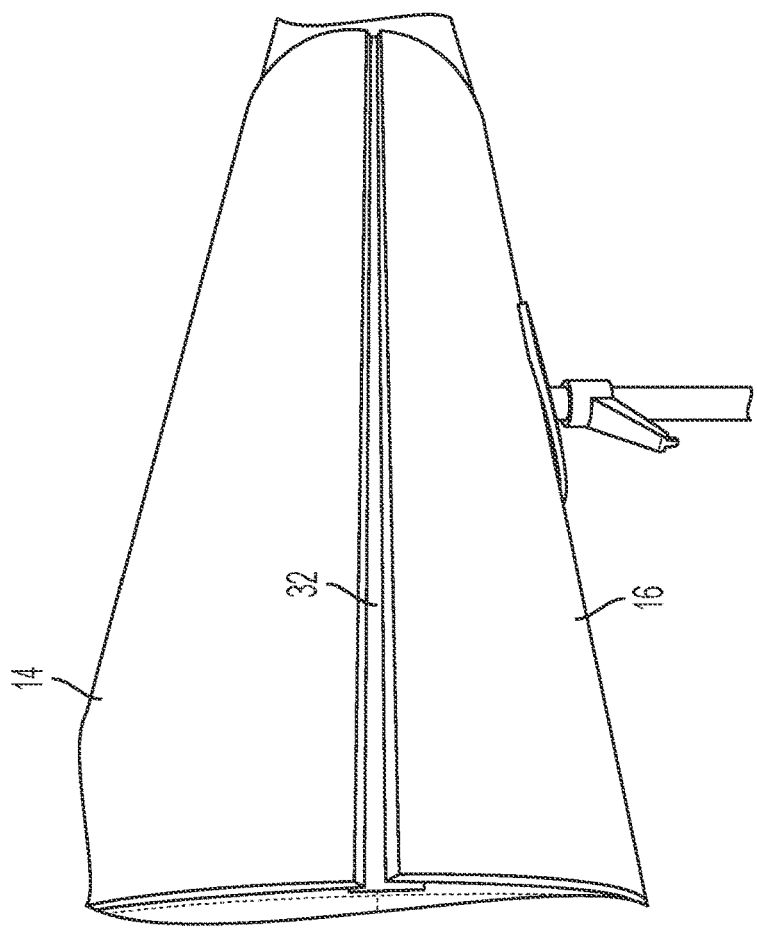
Figure 7:
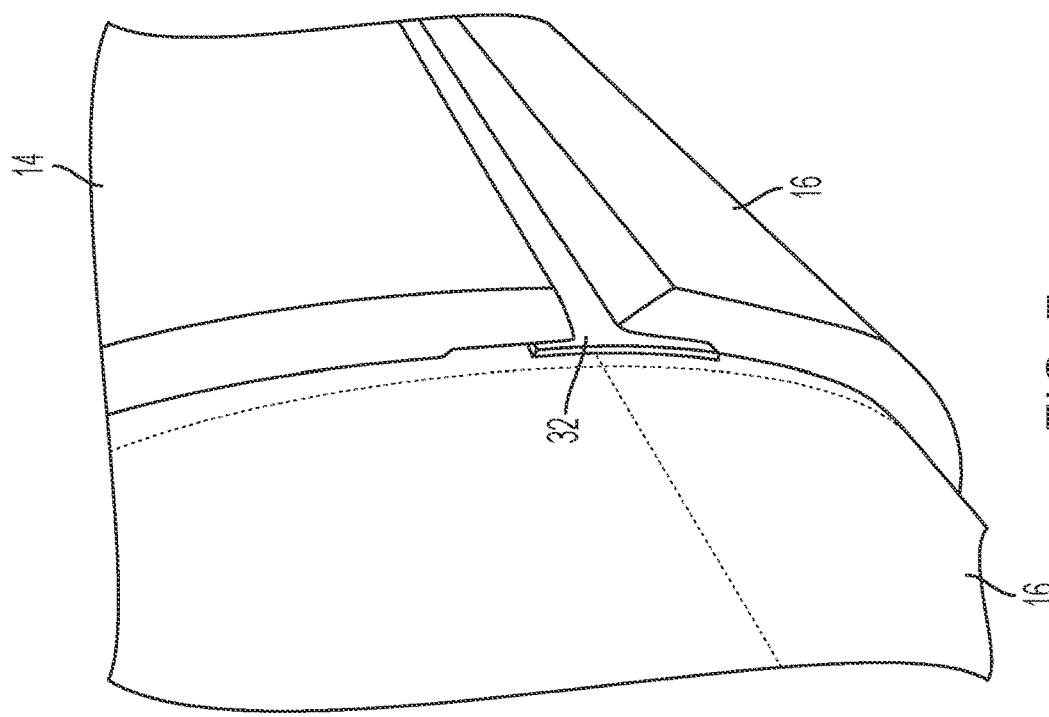

FIGS. 3 and 4 show enlarged alternate views of the sleeve segment 12 installed on the pipe 16. Each of the sleeve segments 12 and 14 has a pair of opposed longitudinal beveled or mitered edges 18 and 20. When installed, each of the mitered edges 18 and 20 of the sleeve segments is parallel to an axis of the sleeve segments and is also parallel to an axis of the pipe 16.

Each of the sleeve segments 12 and 14 also includes a pair of recessed longitudinal slots, notches or grooves 26 and 28 on an inner side of the segments 12 and 14 extending along the longitudinal edges of the sleeve segments. The grooves 26 and 28 extend parallel to an axis of the sleeve segments and parallel to the axis of the pipe. As will be described in detail, the grooves 26 and 28 from one sleeve segment align with the recessed grooves 26 and 28 from another opposed sleeve segment in order to form pockets or spaces to receive backing strips 32 and 34. The width of the pockets is slightly wider than the backing strips.

FIGS. 1 and 2 show one sleeve segment 12 of the two sleeve segments in place around the pipe 16. FIGS. 3 and 4 show one sleeve segment 12 with one backing strip 32 received in the groove.

As shown in FIGS. 1 through 4, once the sleeve segments 12 and 14 are prepared, they may be dry-fitted around the pipe 16 in order to check for a proper fit.

Prior to installation, the exterior of the pipe 16 is cleaned, such as by sand blasting. Other methods of cleaning are, of course, possible within the spirit of the invention. Thereafter, an initially liquid filler is applied to the outside of the pipe 16, to the inside of the sleeve segments 12 and 14, or to both. The initially liquid filler fills any exterior pipe deformations, such as dents or out-of-round areas. The filler will cure to a solid after the segments are installed. Care is taken to keep the initially liquid filler away from the grooves at the edges of the sleeve segments and away from the backing strips.

As seen in FIGS. 1 through 4, the bottom sleeve segment 12 is installed around the pipe and held in place, such as with a jack stand 40.

Thereafter, the backing strips 32 and 34 are put into place in the pockets or spaces formed by the recessed grooves 26 and 28. As seen in FIGS. 5 through 8, the other sleeve segment 14 is then put into place around the pipe 16 with the recessed grooves of the top sleeve segment 14 surrounding the backing strips 32 and 34 and retaining them in place. The pockets formed by the recessed grooves in the sleeve segments 12 and 14 and the exterior of the pipe trap the backing strips therein. The backing strips 32 and 34 are not welded or otherwise affixed to the sleeve segments.

As an alternate process, one backing strip 32 may be welded to one sleeve segment while the other backing strip 32 is welded to the other sleeve segment prior to assembly.

Figure 9:
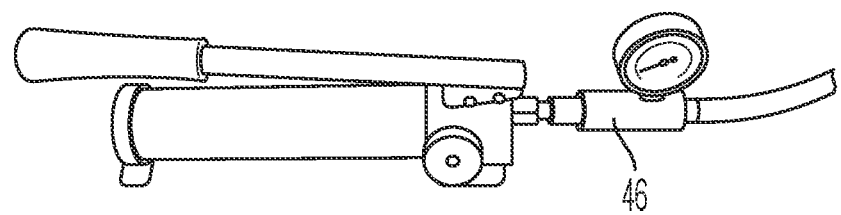
FIGS. 9 and 10 illustrate a hydraulic clamp used in the process to repair a pipe in accordance with the present invention.
Figure 10:
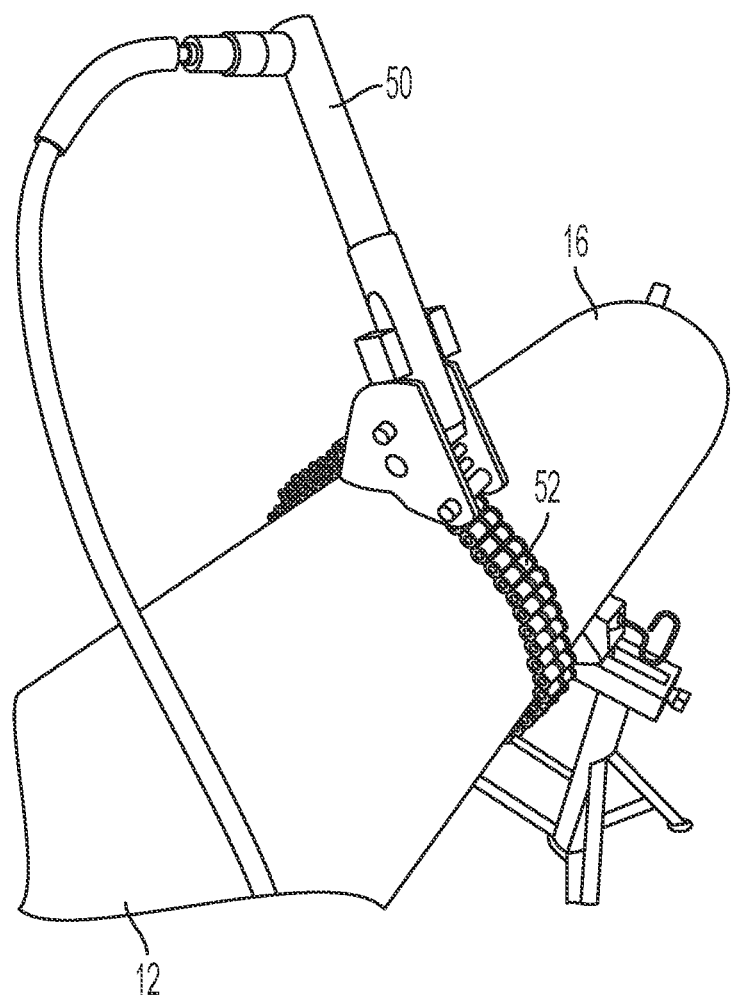

The sleeve segments and the backing strips are then firmly held in place, such as with a chain clamp assembly 46, shown in FIGS. 9 and 10. Either a mechanical sleeve clamp or, as shown, a hydraulic sleeve clamp assembly is utilized.

FIG. 9 illustrates the hydraulic power unit and control 46 while FIG. 10 illustrates the hydraulic cylinder 50 and chain 52 of the clamp. In a preferred embodiment, two hydraulic sleeve clamp assemblies 46 are utilized. Just enough hydraulic pressure is applied to hold the sleeve segments 12 and 14 in place.

A weld gap trough will be formed between the longitudinal edges of the adjacent segments 12 and 14 formed by the opposed beveled edges and the backing strips. The weld gap trough tapers from a wide to a narrow width at the back backing strip. In one non-limiting embodiment, the weld gap trough will be between one-eighth (⅛) and five-sixteenths (5/16) inch.

A thermocouple is then welded or otherwise affixed to each of the sleeve segments 12 and 14 to be used for induction heat control.

Figure 11:
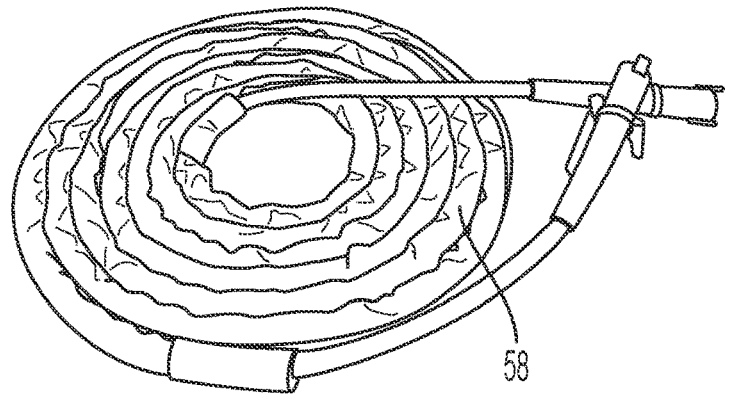
FIG. 11 illustrates an induction coil apart from the pipe and sleeve segments used in the process to repair a pipe.
Figure 12:
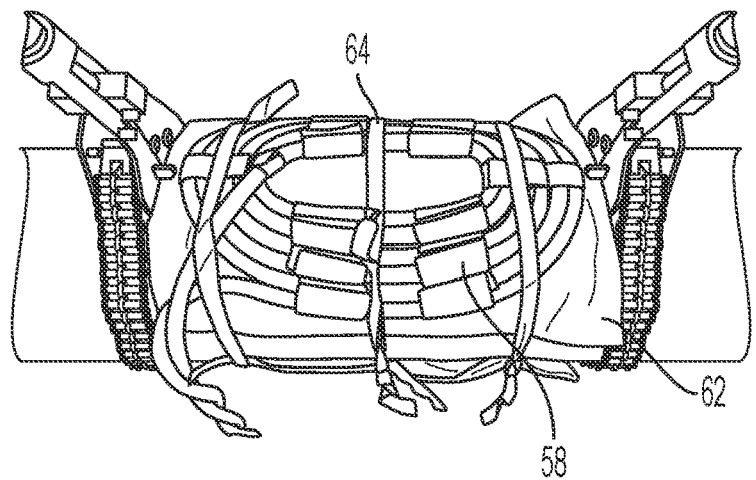
FIGS. 12 and 13 illustrate an induction coil installed on the sleeve segments.
Figure 13:
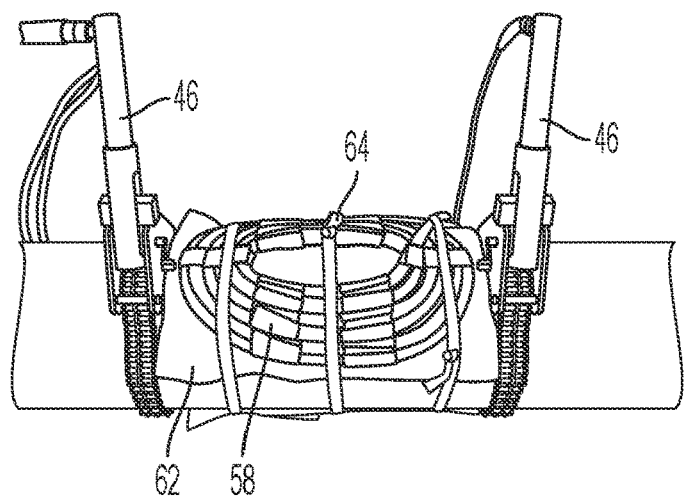

An induction heating coil 58 is then installed on each of the sleeve segments 12 and 14. FIG. 11 illustrates an induction heat coil 58 apart from the pipe 16 and the sleeve segments 12 and 14. FIGS. 12 and 13 illustrate an induction heat coil installed on one of the sleeve segments. In a preferred embodiment, an optional blanket 62 is juxtaposed between the sleeve segment and the induction coil.

The two induction coils 58 and their blankets 62 are then held in place against the sleeve segments, such as with a temperature resistant rope 64.

Thereafter, the power is supplied to the induction heat coils 58. The heat will cause the sleeve segments 12 and 14 to expand while the backing strips 32 and 34 and the pipe 16 remain in their original condition. Once the desired temperature has been achieved, the base of the weld gap trough will be measured. Stated in other words, the distance between the longitudinal edges of the adjacent segments is measured. Once the base of the weld gaps is within a specified measurement range, the sleeve segments 12 and 14 and the underlying backing strips 32 and 34 will be welded. Accordingly, the weld gap troughs are filled.

As an alternative, the sleeve segments 12 and 14 and underlying backing strips are tack welded. After completion of the welds or the tack welds, the induction heat coils will be turned off. As the sleeve segments cool, they will tighten around the pipe and enhance the fit and seal around the pipe.

Figure 14:
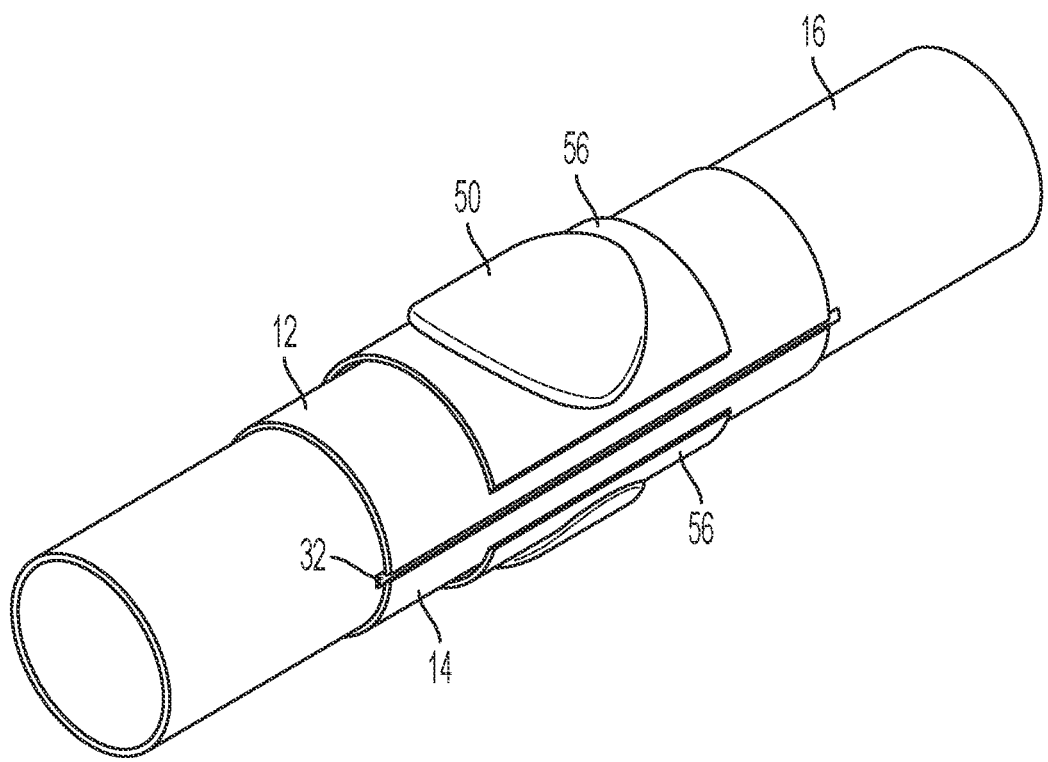
FIG. 14 illustrates a perspective view and FIG. 15 illustrates a side view of the sleeve segments, the backing strips, the heating blankets, and the heating coils installed in place around the pipe.
Figure 15:
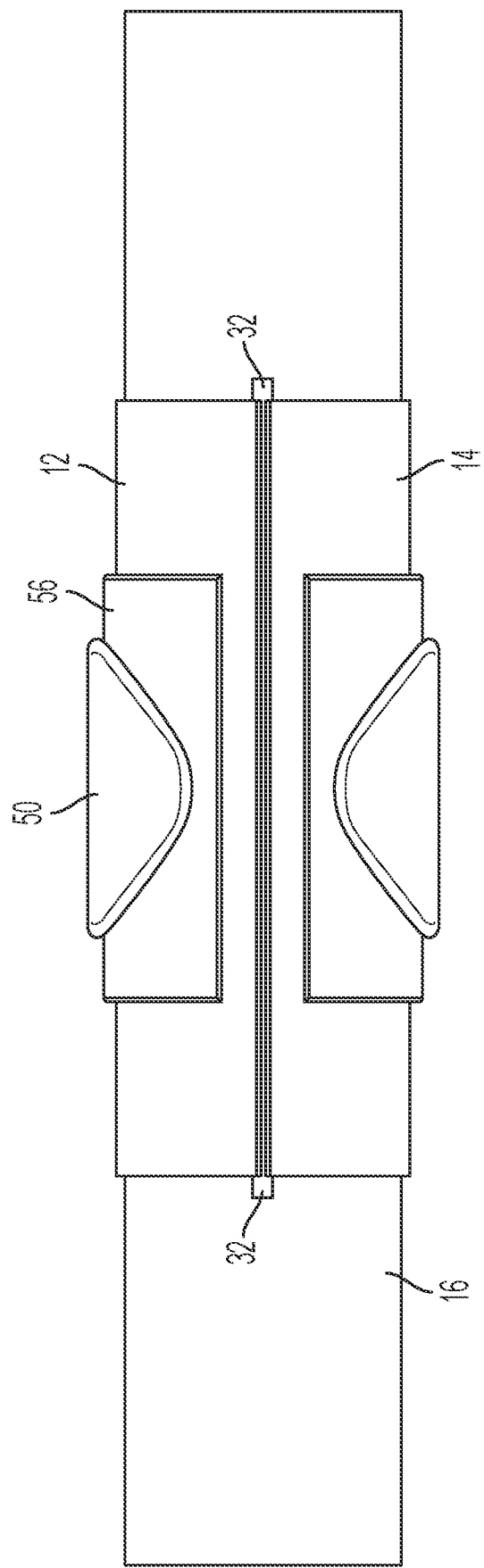

The induction heat coils 58, the blankets 62 will then be removed. The hydraulic sleeve clamp assemblies will then be removed. Finally, the entire weld gap trough seams will be welded. FIG. 14 illustrates a perspective view and FIG. 15 illustrates a diagrammatic side view of the sleeve segments 12 and 14, backing strips backing strips 32 and 34, heating blankets, and induction heating coils installed around the pipe 16.

Whereas, the invention has been described in relation to the drawings attached hereto, it should be understood that other and further modifications, apart from those shown or suggested herein, may be made within the scope of this invention.

What is claimed is:

1. A method of repairing a pipe comprising steps of:
    locating a first sleeve segment and second sleeve segment on the pipe to be repaired, wherein said first sleeve segment defines an inner surface, a first longitudinal edge and a second longitudinal edge, and wherein said second sleeve segment defines an inner surface, a first longitudinal edge and a second longitudinal edge;
    wherein a first pocket is defined by said first sleeve segment along said first longitudinal edge of said first sleeve segment;

wherein a first pocket is defined by said second sleeve segment along said first longitudinal edge of said second sleeve segment;

wherein said inner surface of said first sleeve segment is located adjacent an outer surface of the pipe and said inner surface of said second sleeve segment is located adjacent the outer surface of the pipe;

wherein said first longitudinal edge of said first sleeve segment is spaced apart from said first longitudinal edge of said second sleeve segment defining a first gap therebetween;

locating a first backing strip in said first pocket of said first sleeve segment and in said first pocket of said second sleeve segment for occupying said first gap;

locating a first coiled induction heating device on said first sleeve segment, said first coiled induction heating device defining a central axis, said central axis substantially normal to a longitudinal axis of the pipe;

locating a second coiled induction heating device on said second sleeve segment, said second coiled induction heating device defining a central axis, said central axis substantially normal to the longitudinal axis of the pipe;

securing said first coiled induction heating device to said first sleeve segment;

securing said second coiled induction heating device to said second sleeve segment;

heating said first sleeve segment with said first coiled induction heating device thereby expanding said first sleeve segment;

heating said second sleeve segment with said second coiled induction heating device thereby expanding said second sleeve segment;

welding said first sleeve segment to said second sleeve segment along said first gap;

allowing said first sleeve segment and said second sleeve segment to cool and contract thereby compressing the pipe.

2. The method of repairing a pipe according to claim 1 wherein:
said first longitudinal edge of said first sleeve segment is beveled;
said first longitudinal edge of said second sleeve segment is beveled.

3. The method of repairing a pipe according to claim 1 wherein:
said second longitudinal edge of said first sleeve segment and said second longitudinal edge of said second sleeve segment define a second gap therebetween;
wherein a second pocket is defined by said first sleeve segment along said second longitudinal edge of said first sleeve;
wherein a second pocket is defined by said second sleeve along said second longitudinal edge of said second sleeve;
and further comprising
locating a second backing strip in said second pocket of said first sleeve and in said second pocket of said second sleeve adjacent said gap;
welding said first sleeve segment to said second sleeve segment along said second gap.

4. The method of repairing a pipe according to claim 3 wherein:
said second longitudinal edge of said first sleeve segment is beveled;
said second longitudinal edge of said second sleeve segment is beveled.

5. The method of repairing a pipe according to claim 1 further comprising a step of:
applying a filler prior to said step of locating said first sleeve segment and said second sleeve segment on the pipe for filling in any external pipe deformations in the pipe.

6. The method of repairing a pipe according to claim 1 further comprising a step of:
squeezing said first sleeve segment and said second sleeve segment together prior to said step of welding.

7. The method of repairing a pipe according to claim 6 wherein:
said step of squeezing said first sleeve segment and said second sleeve segment together prior to said step of welding includes installing a sleeve clamp around said first sleeve segment and said second sleeve segment.

8. The method of repairing according to claim 7 wherein:
said sleeve clamp is a hydraulic sleeve clamp.

9. The method of repairing a pipe according claim 1 further comprising:
locating a blanket between said induction heating device and at least said first sleeve segment.

10. The method of repairing a pipe according to claim 1 further comprising:
attaching an induction control thermocouple to at least one of said first sleeve segment and said second sleeve segment prior to said step of heating.

11. The method of repairing a pipe according to claim 1 wherein:
said step of heating is continued until a desired temperature is achieved; and further comprising:
measuring said first gap after said desired temperature is achieved prior to said step of welding.

12. The method of repairing a pipe according to claim 1 further comprising:
measuring temperature with a thermocouple for induction heat control.

13. A method of repairing a pipe comprising steps of:
locating a first sleeve segment and second sleeve segment on the pipe to be repaired, wherein said first sleeve segment defines an inner surface, a first longitudinal edge and a second longitudinal edge, and wherein said second sleeve segment defines an inner surface, a first longitudinal edge and a second longitudinal edge;
wherein said inner surface of said first sleeve segment is located adjacent an outer surface of the pipe and said inner surface of said second sleeve segment is located adjacent the outer surface of the pipe;
wherein said first longitudinal edge of said first sleeve segment is spaced apart from said first longitudinal edge of said second sleeve segment defining a first gap therebetween;
locating a coiled induction heating device on said first sleeve segment, said coiled induction heating device defining a central axis, said central axis substantially normal to a longitudinal axis of the pipe;
securing said coiled induction heating device to said first sleeve segment;
heating said first sleeve segment with said coiled induction heating device thereby expanding said first sleeve segment;
welding said first sleeve segment to said second sleeve segment along said first gap;
allowing said first sleeve segment to cool and contract thereby compressing the pipe.

14. The method according to claim 13 further comprising:
locating a second coiled induction heating device on said second sleeve segment, said second coiled induction heating device defining a central axis, said central axis substantially normal to a longitudinal axis of the pipe;
securing said second coiled induction heating device to said second sleeve segment.

15. The method according to claim 14 further comprising:
heating said second sleeve segment with said second coiled induction heating device thereby expanding said second sleeve segment;
allowing said second sleeve segment to cool and contract thereby compressing the pipe.

* * * * *